(12) United States Patent
Tandler

(10) Patent No.: US 6,275,677 B1
(45) Date of Patent: Aug. 14, 2001

(54) METHOD AND APPARATUS FOR MANAGING A CONSTELLATION OF SATELLITES IN LOW EARTH ORBIT

(75) Inventor: John J. Tandler, Herndon, VA (US)

(73) Assignee: Orbcomm Global, L.P., Herndon, VA (US)

( * ) Notice: Subject to any disclaimer, the term of this patent is extended or adjusted under 35 U.S.C. 154(b) by 0 days.

(21) Appl. No.: 09/261,729

(22) Filed: Mar. 3, 1999

(51) Int. Cl.$^7$ .................................................. H04B 7/185
(52) U.S. Cl. ...................... 455/12.1; 455/13.2; 455/430; 701/13
(58) Field of Search .................... 455/12.1, 13.1, 455/13.2, 13.3, 427, 429, 430, 456; 701/13

(56) References Cited

U.S. PATENT DOCUMENTS

| | | | |
|---|---|---|---|
| 5,109,346 | * 10/1997 | Wertz | 364/459 |
| 5,187,805 | * 2/1993 | Bertiger et al. | 455/12.1 |
| 5,574,660 | * 11/1996 | Diekelman | 364/514 |
| 5,678,182 | * 10/1997 | Miller et al. | 455/12.1 |

* cited by examiner

*Primary Examiner*—Edward F. Urban
*Assistant Examiner*—Blane J. Jackson
(74) *Attorney, Agent, or Firm*—Jennifer & Block

(57) ABSTRACT

A method and apparatus for reconfiguring a satellite based on its position relative to one or more reference points on the Earth's surface. The method and apparatus use dot products defining relative locations of the satellite and predefined regions on the Earth's surface to determine when the satellite is within the predefined region. When the dot product comparison indicates that the satellite is located within the predefined region, a computer on-board the satellite executes a stored command set to reconfigure the satellite's communications protocol for the predefined region in which the satellite is located.

17 Claims, 3 Drawing Sheets

METHOD AND APPARATUS FOR MANAGING A CONSTELLATION OF SATELLITES IN LOW EARTH ORBIT

BACKGROUND OF THE INVENTION

The invention relates generally to satellite control systems and, more particularly, to a method and apparatus for managing the configuration of a fleet of satellites in low earth orbit.

Satellite communications systems which comprise one or more communications satellites that travel about the globe in non-geosynchronous orbits and one or more ground stations located in various regions of the world are known. A given satellite and a given ground station can connect to each other to effect communications when they are in view of each other. However, they generally will not be able to communicate properly unless they are configured to operate according to the same communications protocol.

Different communications protocols are used in different regions of the world. A ground station located in a particular region is configured to operate according to that region's communications protocol. Since the satellites are contemplated to fly over, and communicate with, ground stations in different regions, it is important that the satellites can be reconfigured, on-the-fly, according to the local communications protocols of the regions they fly over and the ground stations located therein.

Direct command control systems whereby a satellite can be reconfigured by executing commands transmitted to the satellite from a ground station are known. However, in some systems, the satellites are receptive to such direct commands from some, but not all, ground stations. For example, a satellite may be receptive to direct command by ground stations located in the United States, but not those located in other parts of the world.

In situations where a satellite needs to adopt only two protocols throughout its orbit, one for use when flying over the command-receptive region and another for all other regions it flies over, the foregoing limitation would not present a significant obstacle to operation. The satellite could simply be reconfigured for the required protocol as it approached and departed from the command-receptive region.

In practice, however, it is likely that a satellite's orbit will take it over several different regions using several different protocols while the satellite is out of sight of, and therefore cannot receive commands from, a ground station in a command-receptive region. To accommodate such situations, the satellite must be reconfigurable by means other than direct control in order to maximize its availability as it travels throughout its orbit.

One known method for reconfiguring a satellite by means other than direct control involves using known information about the satellite's orbit to calculate which regions it will be flying over at which times, and to thus determine which communications protocol it must be configured for at a particular time. This information can be used to generate a command set which can be uploaded to the satellite from a ground station in a command-receptive region. The satellite's on-board computing facilities can then execute the appropriate command set at the appropriate time to reconfigure the satellite, as needed, as it travels throughout its orbit.

While the foregoing method is effective, it requires that the times that the satellite will enter and exit the regions of interest be precalculated on the ground and uploaded to the satellite. Based on the limited computing and storage resources on board the satellite and on other factors, such information generally needs to be calculated and uploaded to the satellite regularly. It may be necessary to upload hundreds of time-based command sets to each satellite every day. This places a significant burden on the ground control staff and hardware, as well as on the limited computing and storage resources on board the satellite. Furthermore, the command upload process is subject to error. The greater the number of commands that must be uploaded, the greater the potential for errors to occur.

Accordingly, it would be desirable to provide a method and apparatus by which a satellite can reconfigure itself autonomously to adopt the local communications protocol of the regions it flies over, which places a minimal burden on the satellite hardware and control staff.

SUMMARY OF THE INVENTION

It is an object of the invention to provide a method and apparatus by which a satellite can efficiently reconfigure itself to adopt a predetermined communications protocol based on its current geographical position.

A satellite ground controller specifies a region on the globe where a particular communications protocol configuration is required by denoting a point on the earth's surface and a radius defining a circle around that point. This data is uploaded to the satellite from a ground station from which the satellite can receive commands. A computer on-board the satellite stores the data defining the region in the form of a dot product derived from the point and radius described above.

Using a global positioning system (GPS) unit or other on-board apparatus for determining geographical position, the satellite monitors its geographical position at regular intervals. Also at regular intervals, the satellite's on-board computer calculates a dot product of a vector from the Earth's center to the point defining the center of the region (for which a particular communications protocol configuration is required) and a vector from the Earth's center to the satellite's current geographical position. The computer compares the stored, regiondefining dot product to the satellite-position dot product at regular intervals. Based on the comparison, the computer determines whether or not the satellite is within the defined region. If the computer deems that the satellite has entered the defined region, it executes a command set which configures the satellite to operate with the defined region's communications protocol. When the satellite exits the defined region, another command set is executed, returning the satellite to a default configuration, or to a configuration supporting the communications protocol of an adjoining defined region.

In another embodiment of the invention, the regions are global areas defined in terms of, for example, latitude and longitude, rather than as circular areas. Data, such as latitude and longitude coordinates, defining such regions are be stored on-board the satellite. The satellite's computer compares the stored data to regularly obtained data defining the satellite's position. If the computer deems that the satellite has entered the defined region, it executes a command set which configures the satellite to operate with the defined region's communications protocol. When the satellite exits the defined region, another command set is executed, returning the satellite to a default configuration, or to a configuration supporting the communications protocol of an adjoining defined region.

The method and apparatus of the present invention can be applied to a fleet of satellites, as well as to a single satellite. Furthermore, each satellite can store data defining a predetermined number of regions. The satellite's on-board computer can compare the data defining the satellite's current location to the data defining the defined regions at regular intervals, and can execute a command set to configure the satellite to operate with the protocol of the defined region over which it is flying at a particular time.

In an embodiment of the invention, a satellite has plural facilities for receiving and transmitting data. A first set of transmitting and receiving equipment can be configured according to the communications protocol of a first region and can communicate with a ground station therein. Simultaneously, a second set of transmitting and receiving equipment can be configured according to the communications protocol of a second region and can communicate with a ground station therein.

DETAILED DESCRIPTION OF THE PREFERRED EMBODIMENT

The present invention provides a method and apparatus for managing the configuration of a communications satellite so that the satellite can be configured for operation with any one of a plurality of predetermined communications protocols, according to the satellite's location over the Earth.

Different regions of the world adopt different communications protocols. Such regions are typically defined by political borders, as communications protocols are generally established by government units. Defining political borders in terms of a coordinate system is often very complicated. The present invention applies techniques to simplify the manner in which regions are defined, as will become evident.

Figure 1:
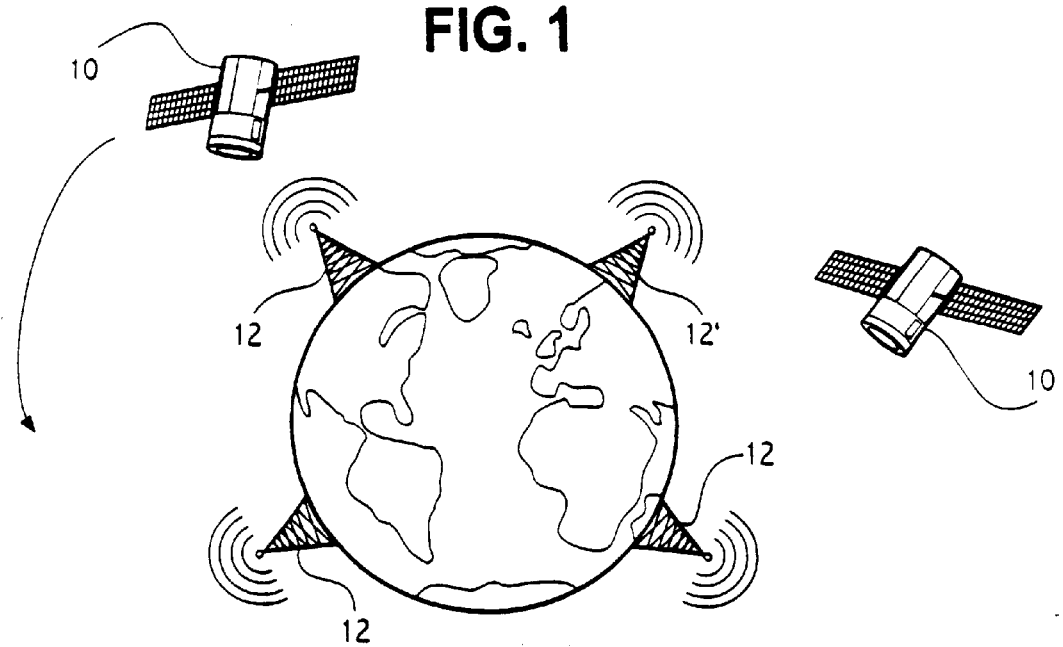
FIG. 1 is a diagrammatic representation of an apparatus according to the present invention.

Referring to FIG. 1, a preferred embodiment of an apparatus according to the present invention comprises one or more satellites 10 and one or more ground stations 12 and 12' located in various regions of the world. Some of the ground stations, denoted as 12', may have direct satellite command control capabilities, while others, denoted as 12, may not. That is, a satellite may be receptive to direct commands which emanate from some, but not all, ground stations. In a preferred embodiment, ground stations located within the United States have direct satellite command control capabilities, while those located outside the United States do not.

Figure 2:
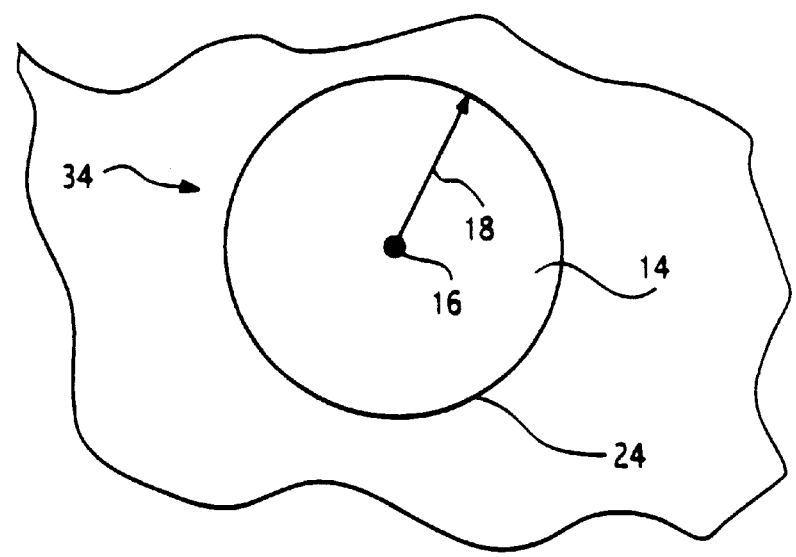
FIG. 2 is a diagrammatic representation of a defined region.

Each ground station 12 is configured in accordance with the communications protocol of the region of the world in which it is located. Referring to FIG. 2, a region 14 may be defined as the area within a circle 34 having a center point 16 on the Earth's surface and a radius 18 emanating from point 16. Geographical position data defining each region 14 can be uploaded to satellite 10 by an operator at a ground station 12' having direct command control capability. There may be more than one ground station 12 or 12' in a particular region 14.

Figure 3:
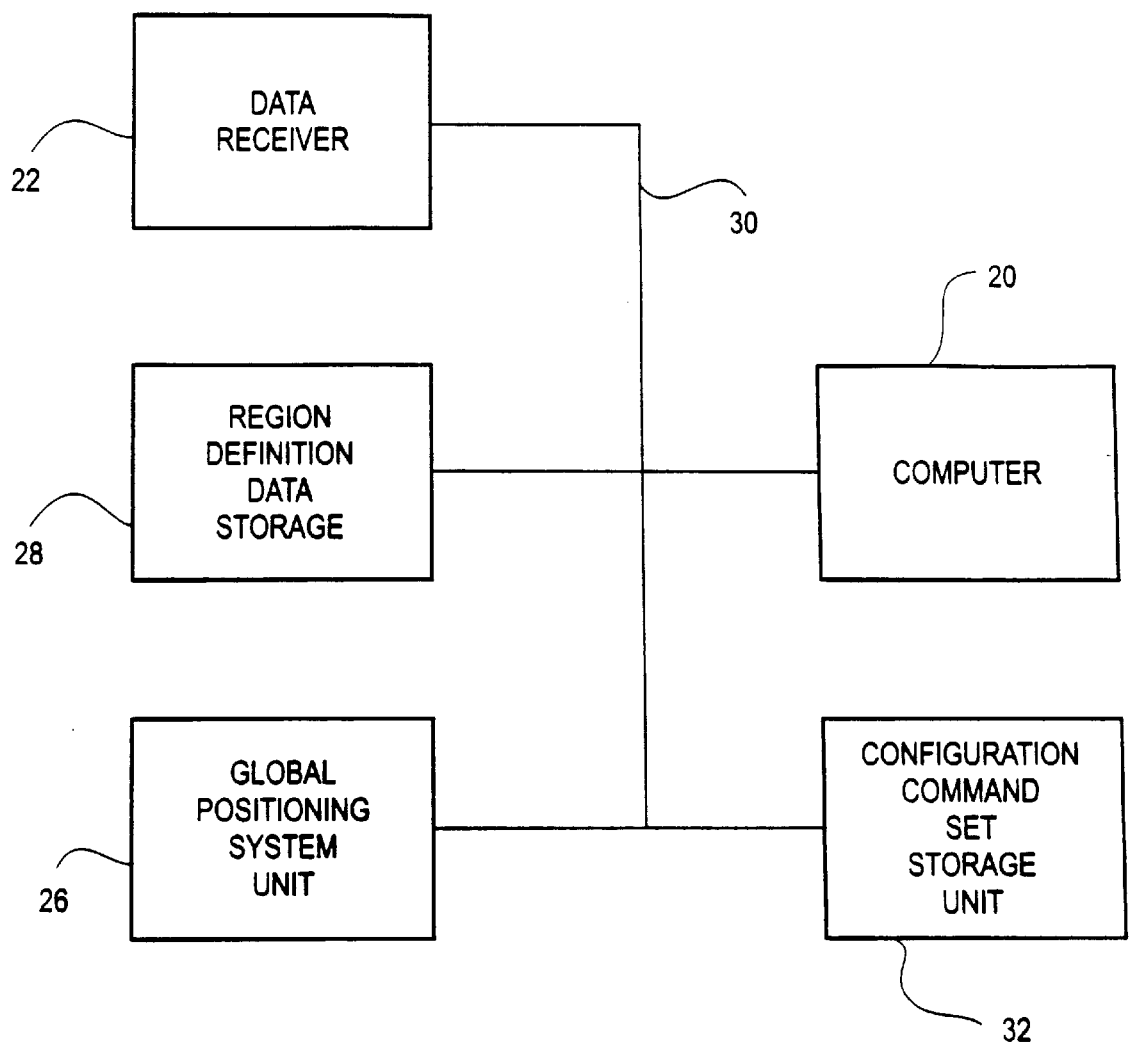
FIG. 3 is a block diagram representation of a portion of an apparatus according to the present invention.

Referring to FIG. 3, each satellite 10 according to the present invention has a data receiver 22 for receiving commands and other data from a ground station 12'. Each satellite 10 also has an on-board computer 20 which communicates with data receiver 22 by means of communications bus 30. Onboard computer 20 uses the uploaded region-defining data received by receiver 22 by calculating the dot product of a vector from the center of the Earth to the region's center-point 16 and a vector from the center of the Earth to a point on the region's perimeter 24. Computer 20 calculates a dot product in this manner for each predefined region 14 for which defining data has been uploaded. Each region-defining dot product thus calculated is stored in region definition storage unit 28, which communicates with computer 20 by means of communications bus 30.

In an alternate embodiment, data defining each region 14 may be converted to a dot product at ground station 12' or other terrestrial location and uploaded to data receiver 22 of satellite 10 from ground station 12' in dot product form for storage in region definition data storage unit 28 and for use by computer 20. Furthermore, the dot products described herein may be based on vectors emanating from points other than the Earth's center.

In a preferred embodiment, each satellite 10 has an on-board global positioning system (GPS) unit 26 which determines the position of satellite 10 at any point in time and provides such position data to computer 20 by means of communications bus 30. In alternate embodiments, any suitable system for determining the satellite's position, such as a sun sensor, a star tracking system, or an inertial navigation system, may take the place of GPS unit 26.

At regular intervals, computer 20 uses geographical location data provided by GPS 26 to calculate the dot products of vectors from the center of the Earth to center point 16 of each predefined region 14 and a vector from the center of the Earth to satellite 10. Computer 20 compares the dot product thus calculated with each region-defining dot product stored in region definition data storage unit 28. If the thus-calculated dot product is greater than or equal to any of the region-defining dot products stored in storage unit 28, satellite 10 will be deemed to be within that region 14, and computer 20 will execute a predetermined set of commands stored in command set storage unit 32. Executing the set of commands causes satellite 10 to be configured according to the communications protocol applicable in that region 14. Satellite 10 remains configured for that protocol until the current satellite position dot product indicates that satellite 10 is no longer within the applicable region 14. When this happens, computer 20 executes a set of commands which returns the configuration of satellite 10 to a default configuration, or to a configuration supporting the communications protocol of an adjoining defined region 14 which satellite 10 may have entered as it departed from the prior region 14. In a preferred embodiment, position data acquisition and comparison to predefined region data as described above is performed once per minute. In alternate embodiments, position data acquisition and comparison to predefined region data may be performed with greater or lesser frequency.

In a preferred embodiment, region definition data storage unit 28 can store regiondefining data for up to twenty regions 14, and command set storage unit 32 can store command sets which computer 20 can execute to configure satellite 10 for the communications protocol applicable to each region 14. Thus configured, satellite 10 can fly over twenty different regions 14, each having a different communications protocol, in a single orbit, being able to reconfigure itself on-the-fly according to the communications protocol used in each of the regions 14 over which it flies. In other embodiments, region definition data storage unit 28 can store regiondefining data for a greater or lesser number of regions 14.

Command set storage unit 32 can also store command sets which computer 20 can execute to vary selected operational parameters of satellite 10. For example, satellite transmission power requirements may vary from one region 14 to another. Scarce satellite power resources can be conserved by reducing signal transmission power where permissible. Computer 20 can execute command sets to configure transmission power and other operational parameters of satellite 10 according to the needs of each region 14 as satellite 10 enters and exits each region 14. Command set storage unit 32 can be loaded with all required command sets prior to launching satellite 10. Alternatively, command sets may be revised, added to, or deleted from command set storage unit 32 using direct control commands from a ground station 12'.

In an alternate embodiment, the pre-defined regions around the world may be defined in terms of rectangular coordinates, i.e. latitude and longitude. Data defining such regions are stored in region definition data storage unit 28 in terms of rectangular coordinates. Computer 22 on-board satellite 10 compares satellite position data provided by GPS unit 26 in terms of rectangular coordinates to the region-defining data stored in region definition data storage unit 28 to determine whether satellite 10 has entered a region. Based on the comparison, computer 20 selectively executes commands to configure satellite 10 according to the required communications protocol. This embodiment is useful in situations where circles defining adjacent regions would overlap, and where communications protocols differ among the adjacent regions. In such situations, a satellite could be deemed to be within two regions at the same time, creating a potential for communications protocol configuration errors to occur. However, this embodiment requires greater computing and data storage resources on-board satellite 10, and the dot product technique is therefore preferred for many applications.

In another alternate embodiment, a particular satellite 10 includes multiple transmitting and receiving apparatus (not shown). In this embodiment, it may be permissible to define overlapping regions 14. Each transmitting and receiving apparatus (not shown) can be configured according to a particular communications protocol. A satellite 10 with two transmitting and receiving apparatus can be simultaneously configured according to two or more different communications protocols. A first transmitting and receiving apparatus can be configured according to a first communications protocol, and a second transmitting and receiving apparatus can be configured according to a second communications protocol. Thus configured, a satellite 10 can be within two or more regions simultaneously and provide communications services to each of such regions.

Figure 4:
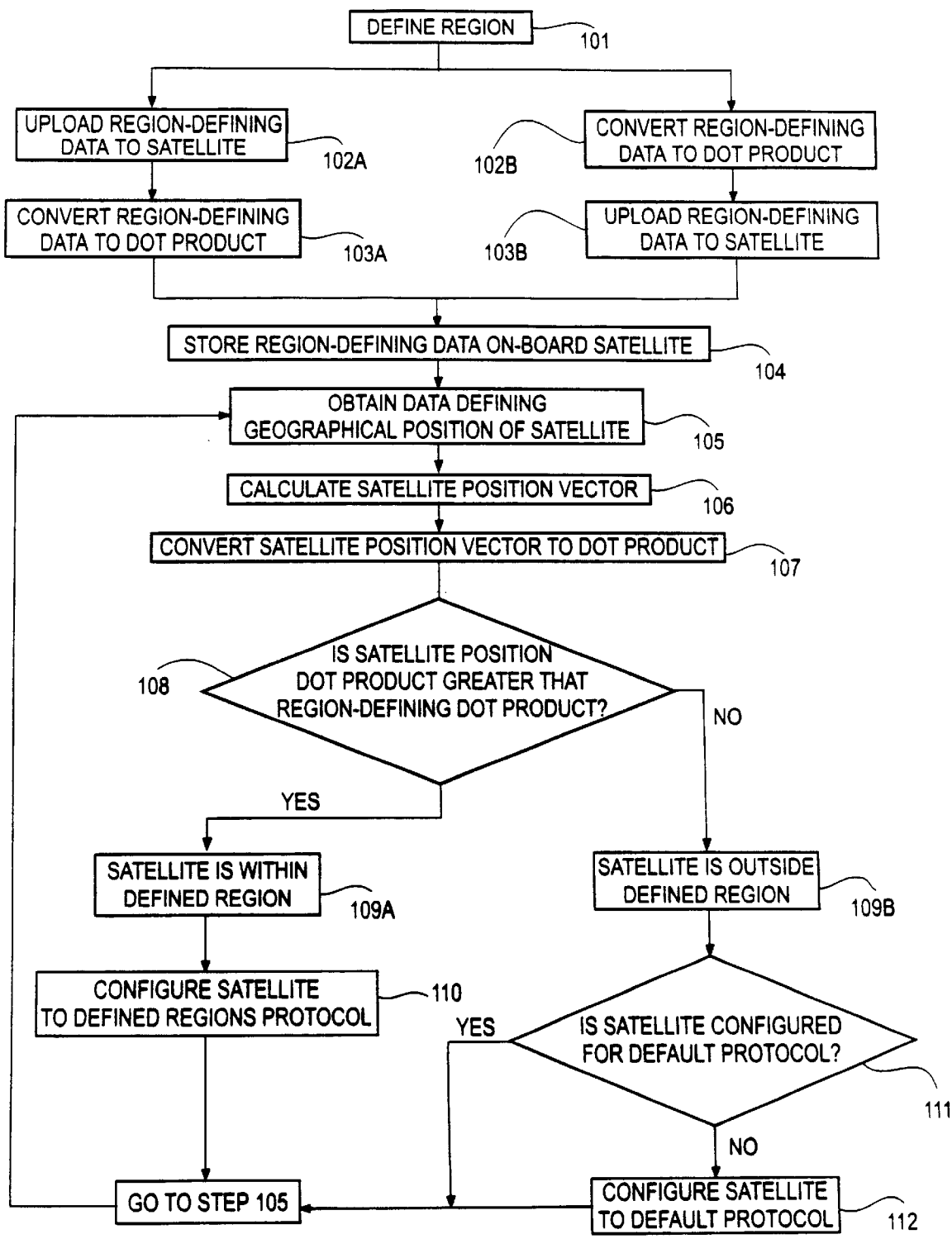
FIG. 4 is a flowchart illustrating the steps comprising a preferred embodiment of the method according to the present invention.

FIG. 4 illustrates the steps of a preferred embodiment of the method of the present invention. One or more regions of the world having at least one ground station for communicating with a satellite are identified by a satellite ground control operator, Step 101. Each region is defined by a centerpoint and a radius defining a circle about the centerpoint.

The region-defining data and a command set for configuring the satellite to adopt the region's communications protocol are uploaded to the satellite by the satellite ground controller at a ground station having direct command capability, Step 1 02A.

The satellite's on-board computer uses the region-defining data to calculate a dot product of a vector from the center of the Earth to the region's centerpoint and a vector from the center of the Earth to a point on the region's perimeter, Step 103A.

Alternatively, the region-defining dot product may be calculated at the ground station, or other terrestrial location, Step 1 02B, and uploaded to the satellite in that form, Step 103B.

The satellite computer stores the dot product for the defined region in memory, Step 104.

At predetermined intervals, an on-board GPS unit provides data identifying the satellite's geographical position to the satellite computer, Step 105. The computer uses the GPS data to calculate a vector from the Earth's center to the satellite's position, Step 106. The computer then calculates the dot product of this vector and a vector from the Earth's center to the region's centerpoint on the Earth's surface, Step 107.

The computer compares the calculated satellite position dot product with each stored region-defining dot product, Step 108. If the satellite position dot product is greater than or equal to a particular region-defining dot product, the satellite is deemed to be within that particular region, Step 109A. If the satellite dot product is less than a particular region-defining dot product, the satellite is deemed to be outside the particular region, Step 109B.

If the satellite is deemed to have entered a region, based on the dot product comparison, the computer executes a command set causing the satellite to be configured for the communications protocol desired for the region over which the satellite is flying, Step 110. The steps of the method are then reiterated, beginning with Step 105.

If the satellite is deemed to have not entered a region, Step 109B, based on the dot product comparison, the computer determines whether the satellite is configured for a default protocol or for a defined region's protocol, Step 111. If the satellite is configured for a defined region's protocol, the computer executes a command set causing the satellite to be configured for the default protocol desired for the region over which the satellite is flying, Step 112. The steps of the method are then reiterated, beginning with Step 105.

In a preferred embodiment, Steps 105–112 are performed about once each minute. In other embodiments, Steps 105–112 may be performed at longer or shorter intervals.

While several embodiments of the present invention have been described herein, it would be obvious to those skilled in the art that numerous modifications may be made without departing from the spirit of the claims appended hereto. For example, although the invention is described in terms of satellites orbiting the Earth, the invention could easily be adapted for use with objects orbiting other bodies by making obvious modifications to the embodiments described herein.

I claim:

1. A method for configuring the operation of a communications satellite, comprising the sets of:

providing data defining the geographical location of a region on a body;

providing data defining the geograhical position of said satellite;

comparing said data defining said geographical location of said region to said data defining said geographical position of said satellite; and selectively configuring said satellite to operate in a predetermined manner when said step of comparing indicates that said satellite is within said region;

wherein said region comprises a substantially circular area having a center point and a perimeter, wherein said data defining said region is expressed as a dot product of a first vector and a second vector and wherein said data defining said geographical position of said satellite is expressed as a dot product of said first vector and a third vector.

2. The method according to claim 1 wherein said first vector is a vector from said body's center to a point on said centerpoint.

3. The method according to claim 1 wherein said second vector is a vector from said body's center to a point on said perimeter.

4. The method according to claim 1 wherein said third vector is a vector from said body's center to said geographical position of said satellite.

5. The method according to claim 1 wherein said body is the Earth.

6. The method according to claim 1 wherein said step of comparing said data defining a region to said data defining the geographical position of said satellite comprises comparing said dot products.

7. The method according to claim 1 wherein said geographic location of said satellite is provided by a global positioning system apparatus.

8. The method according to claim 1 wherein said geographic location of said satellite is provided by a sun sensor apparatus.

9. The method according to claim 1 wherein said geographic location of said satellite is provided by a star tracking system apparatus.

10. The method according to claim 1 wherein said geographic location of said satellite is provided by an inertial navigation apparatus.

11. A method for configuring the communications protocol of a communications satellite, comprising the steps of:

defining the geographical location of a region;

defining the geographical position of the satellite;

comparing the geographical location of the region to the geographical position of the satellite; and selectively configuring the satellite for a predetermined communications protocol when the step of comparing indicates that the satellite is within the region;

wherein said region comprises a substantially circular area having a center point and a perimeter, wherein said data defining said region is expressed as a dot product of a first vector and a second vector and wherein said data defining said geographical position of said satellite is expressed as a dot product of said first vector and a third vector.

12. An apparatus for configuring an operating mode of a satellite as a function of the satellite's location, comprising:

data storage means for storing defining a predetermined ground position;

position determining means for determining the geographical position of said satellite;

comparing means for comparing said predetermined ground position to said satellite position; and operating mode configuring means for selectively configuring an operating mode of said satellite in a predetermined manner when said predetermined ground position corresponds to said satellite position in a predetermined manner;

wherein said predetermined ground position comprises a substantially circular area having a center point and a perimeter, wherein said substantially circular area is defined in terms of a dot product of a first vector and a second vector, and wherein said geographical position of said satellite is defined in terms of a dot product of said first vector and a third vector.

13. An apparatus for configuring an operating mode of a satellite as a function of the satellite's location, comprising:

a ground position memory unit for storing data defining a predetermined ground position;

a command set memory unit for storing at least one executable command set;

a positioning unit for determining the geographical position of said satellite, wherein said positioning unit is configured to output data defining said position of said satellite; and a processor operably associated with said ground position memory unit, said command set memory unit, and said positioning unit, wherein said processor compares said data defining said predetermined ground position to said data defining said satellite location, wherein said processor selectively executes said at least one executable command set to configure an operating mode of said satellite in a predetermined manner, wherein said data defining a predetermined ground position is defined in terms of a circular area, and wherein said circular area is defined as a dot product.

14. The apparatus of claim 13 wherein said positioning unit comprises a global positioning system unit.

15. The apparatus of claim 13 wherein said positioning unit comprises an inertial navigation system.

16. The apparatus of claim 13 wherein said data defining a predetermined ground position is defined in terms of rectangular coordinates.

17. The apparatus of claim 13 wherein said processor selectively executes a plurality of command sets to configure a plurality of operating modes of said satellite in a predetermined manner.

* * * * *